June 26, 1945.　　　P. D. PAYNE　　　2,379,374
MANUFACTURE OF ELECTRIC STORAGE CELLS
Filed March 17, 1943　　　3 Sheets-Sheet 1
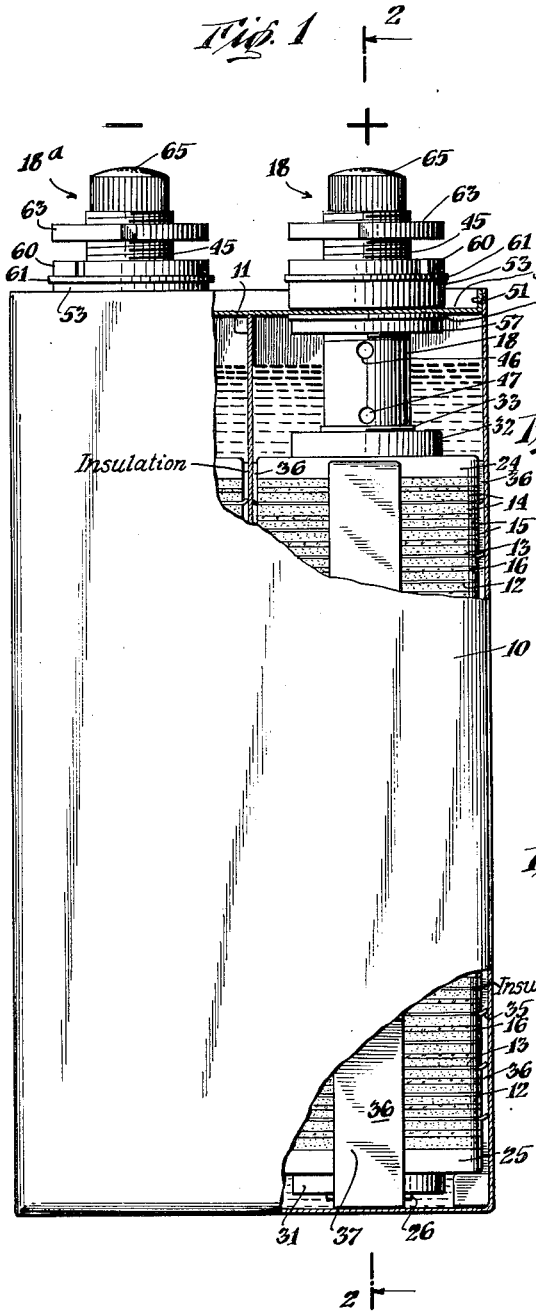
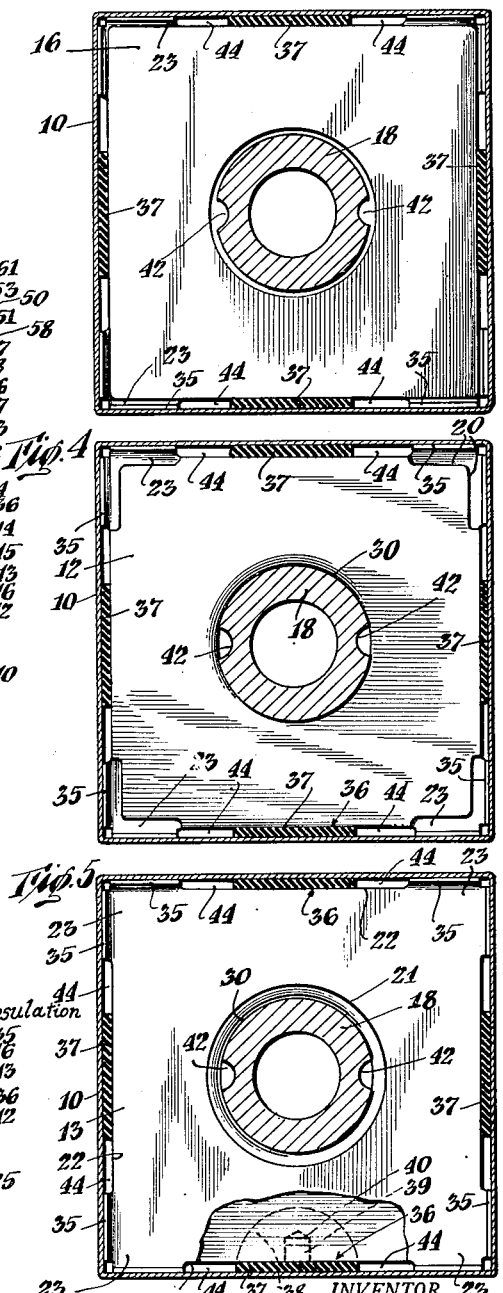
INVENTOR.
Paul D. Payne
BY
John C. Kerr
ATTORNEY

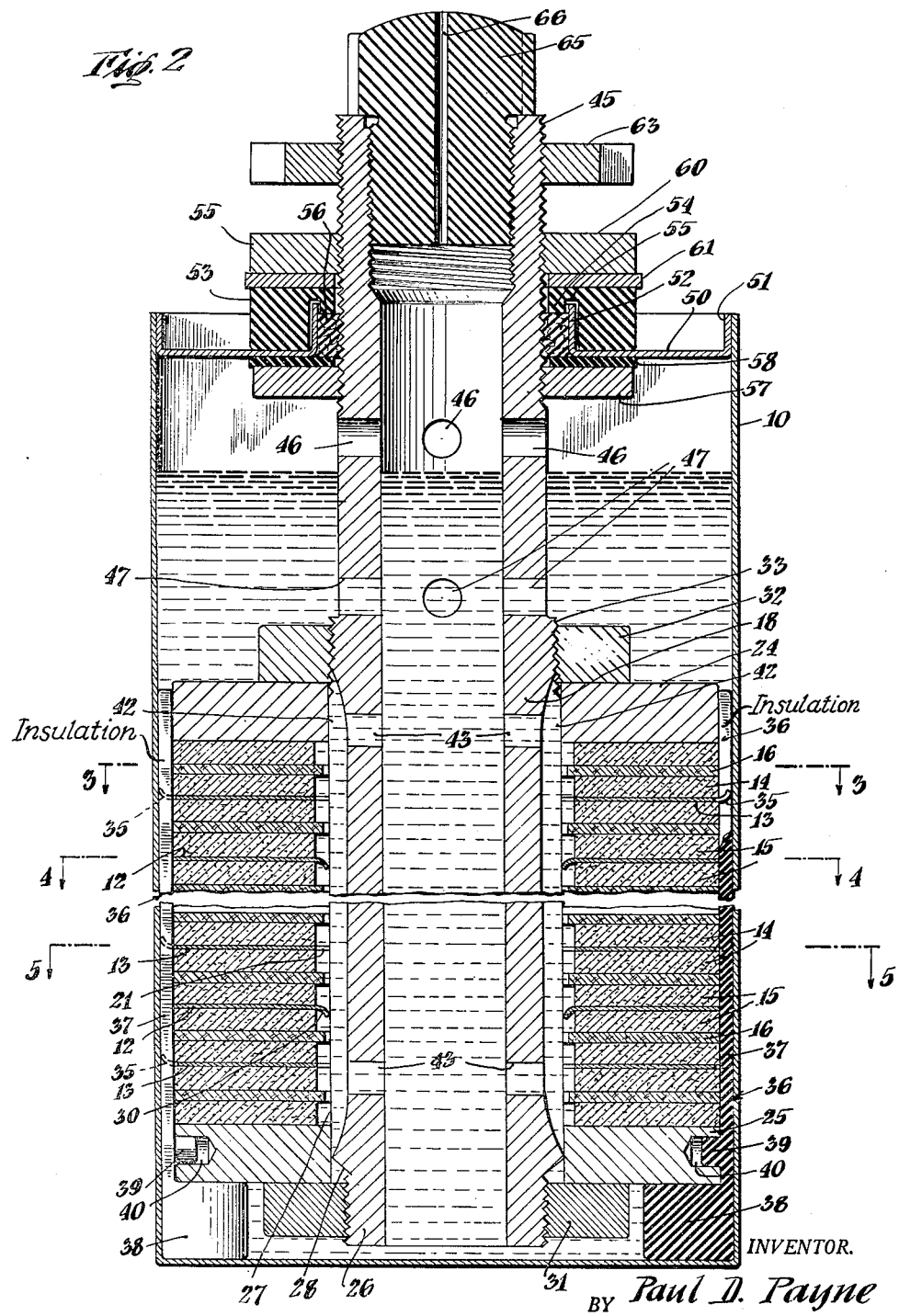

June 26, 1945.  P. D. PAYNE  2,379,374
MANUFACTURE OF ELECTRIC STORAGE CELLS
Filed March 17, 1943  3 Sheets-Sheet 3
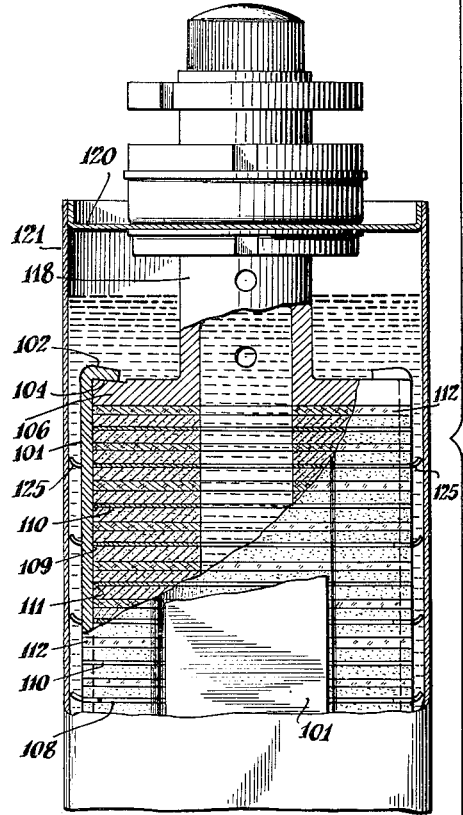
Fig. 6
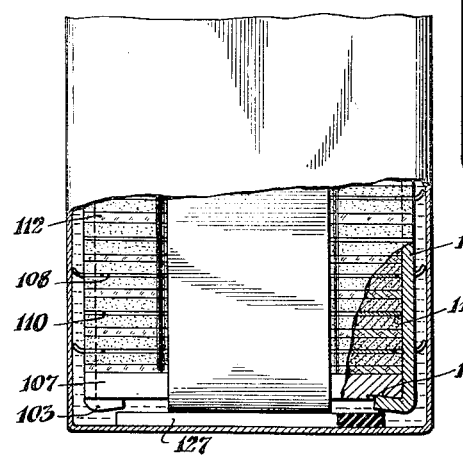
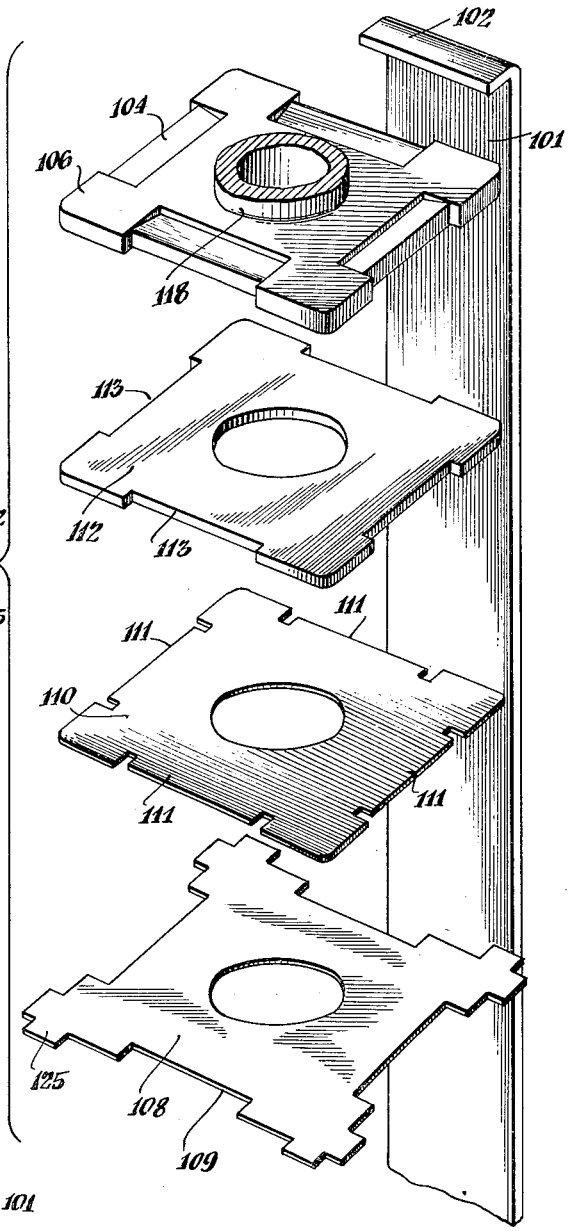
Fig. 7
INVENTOR.
Paul D. Payne
BY
John C. Kerr
ATTORNEY Patented June 26, 1945

2,379,374

UNITED STATES PATENT OFFICE 2,379,374

MANUFACTURE OF ELECTRIC STORAGE CELLS

Paul D. Payne, Irvington, N. J.

Application March 17, 1943, Serial No. 479,409

18 Claims. (Cl. 136—17)

The usual construction of electric storage cells of the so-called nickel-iron or alkaline type has been such as to provide a relatively high internal resistance and an inferiority in ampere- and watt-hour efficiency as compared with lead storage batteries, so that although widely used for many purposes, the nickel-iron battery has never been commercially acceptable, so far as I am aware, for a number of important uses, of which a chief example is that of a starting and ignition battery in motor vehicles.

Attempts have been made to provide characteristics in the alkaline type of cell which would overcome its deficiencies of the sort mentioned, particularly for automotive use where a very high discharge rate is required. For example, the laminated type of construction disclosed in the Edison Patents Nos. 1,377,194 (May 10, 1921); 1,379,088 (May 24, 1921); Re. 16,614 (May 3, 1927); 1,559,562 (Nov. 3, 1925); 1,651,196 (Nov. 29, 1927); 1,649,579 (Nov. 15, 1927); and 1,821,572 (Payne and Iversen, Sept. 1, 1931), represented a distinct improvement in many respects, as determined by practical tests, and cells made in accordance with the disclosures of those patents were found to have the desirably low internal resistance and improved electrical efficiency required for automotive use, while at the same time possessing the lightness of weight, and in theory the durability and longevity, which are notable features of superiority of the alkaline cell over the lead type. Construction of cells according to the cited Edison patents, however, has appeared to require expensive manufacturing operations and has involved certain difficulties which result in considerable non-uniformity or other unreliability of the product, serious obstacles to economical manufacture of the cell in large quantities, particularly in competition with the relatively much less costly batteries of the usual lead and acid type.

In general, the laminated type of cell—as distinguished from the tube-and-pocket type, which is the alkaline cell of commerce but is unsuited for general automotive use—comprises a compressed stack or pile of alternating positive and negative elements separated by porous insulating sheets, preferably long fibre asbestos paper. A convenient form for the positive elements, as thus proposed, consists of a sheet of metal foil, preferably nickel, carrying on each side a layer of finely divided nickel hydroxide, and the negative elements consist of a similar sheet of nickel foil sandwiched between layers of electrolytically active, finely divided iron, preferably mixed with a small amount of mercury. For a practical assembly operation, it is usually convenient to apply the layers of active material to the asbestos paper separators, i. e. a positive layer on one side and a negative layer on the other side of each separator, and then to make up the stack of laminae by inserting a sheet of metal foil intermediate the doubly-coated separators, so that alternate foil sheets may be connected respectively to the positive and negative poles of the battery.

It has been found that for lowest resistance (e. g. between the metal sheets and the active material), for best overall results, and to avoid erratic performance, all parts of the laminated stack should be maintained under a considerable pressure, of a high and sometimes critical order. At the same time, the pressure should not be so high that the electrolyte cannot suitably permeate the laminated unit, particularly the asbestos separators; the unit being immersed in the electrolyte, which consists of a suitable alkaline solution, such as a solution of caustic potash or soda, advantageously containing a small quantity of lithium hydroxide. Moreover, because of the expansion and contraction of the active positive material on charge and discharge respectively, the clamping means for the stack may require some resilience or at least be able to take up such changes without departing either way from the desired range of pressure.

Not only has it thus been found difficult to maintain the desired, uniformly high pressure, and at the same time to achieve the necessary permeation of electrolyte, but the difficulty has been increased because for electrical reasons, the clamping rods and associated devices for holding the stack together under pressure have required the use of hard rubber or like insulating washers, sleeves, or clamping members, through or against which the pressure was sought to be maintained. The use of such insulating members tends to non-uniformity among the cells, and produces a tendency toward change, usually degradation, of the characteristics of the cell over a period of time. One disadvantage of hard rubber and like plastic insulating materials, which are suitably inert to the alkaline electrolyte and do not break under high clamping pressure, is a tendency to flow or other slow progressive deformity, especially under the heat of operation of the cell and with elongation of the assembly on charge. Thus the pressure in the stack of active elements will decrease over a period of time, raising the electrical resistance, and even this disadvantage may be unpredictable because of differences among hard rubber elements, i. e. in thickness, in content of compounding ingredients, in state of cure. Such differences also lead to non-uniformity in other respects among cells and where several hard rubber members are used in one cell, there may be an unbalance, overworking one part of the cell to the detriment of output, life and voltage characteristics.

Accordingly, chief objects of the present invention are to provide novel elements and novel combinations, in cells of the character described, wherein one or more of the difficulties explained above may be obviated or minimized, and at the same time to provide a new, notably simplified and less expensive structure for secondary cells of the nickel-iron type, and especially for batteries made of such cells. More specific objects include the provision of a novel form of storage cell of the type described, which may be manufactured in large quantity with a minimum of machine and hand operations and yet which is such as to provide uniformly the desired characteristics of low internal resistance and high efficiency as well as the more usual points of superiority of the alkaline type of battery.

An important specific feature of the invention resides in a simplified construction which completely avoids all necessity for hard rubber or other insulating members of the character described above, in the clamped or compressed assembly of active elements or electrodes. At the same time, further and other advantageous features of my improved cell and battery construction include a simplified and improved arrangement for making positive and practically everlasting contact with the metal elements of the compressed stack, a novel arrangement for promoting circulation or permeation of the electrolyte, a construction affording greatly simplified intercell connection, and combinations affording these features by reason of novel structural cooperation among the several elements and with a much fewer number of parts and with considerably less metal or other material than would be required in apparatus as heretofore proposed. Further objects include such as are herein stated or apparent, and such as are incidental to the manufacture and use of structures embodying my improvements.

The novel principles and structural features of the invention may be conveniently explained by reference to the accompanying drawings, which show, by way of illustrative example, certain presently preferred forms of cell structure embodying the invention.

In the drawings:

Fig. 1 is a side elevation of a twin-cell unit, with certain portions of the can or container cut away;

Fig. 2 is an enlarged vertical section on lines 2—2 of Fig. 1;

Figs. 3, 4 and 5 are horizontal sections, respectively on lines 3—3, 4—4 and 5—5 of one of the cells of Fig. 2, Fig. 5 having a certain portion cut away to reveal a lower part of the structure;

Fig. 6 is an elevation of a modified type of cell embodying the invention, certain portions of the casing being cut away to show the internal structure and certain portions of the latter being in turn revealed in vertical section; and Fig. 7 is an exploded perspective view of certain clamping and active plates, together with part of a clamping strip, as employed in the internal structure of the device in Fig. 6.

Referring now to Figs. 1 to 5 inclusive, especially the enlarged view of Fig. 2, the cell comprises a container or can 10, conveniently made of iron, nickel-plated steel, nickel or other conducting material suitably resistant to deterioration by electrical or chemical influences in the cell; although other forms, e. g. cylindrical, may be used, it is presently preferred to make the container of rectangular or square horizontal section as shown. For certain purposes, the container may comprise a can of rectangular horizontal shape (Fig. 1), provided with a central vertical partition 11, made of the same metal or equivalent conducting material, so that there are two chambers, each conveniently of square cross-section, providing a two-cell unit as hereinafter to be explained.

The mechanical structure of the cells comprising the unit in Fig. 1 being identical, the following description may conveniently refer to a single cell, as is shown in Figs. 3 to 5 inclusive.

The laminated stack of positive and negative elements forming the cell—much exaggerated in thickness, for clarity of illustration in the drawings—consists of alternating metal sheets or thin plates 12, 13, respectively sandwiched between layers of active material 14, 14 and 15, 15, with insulating separators 16, conveniently of asbestos paper, disposed between each pair of active layers 14, 15. It will become apparent that the plates 12 and their associated active material may be positive, and the plates 13 and associated material negative, if desired; or the reverse arrangement may be employed, the plates 12 and associated material 14 being negative and the assemblies 13, 15 positive. Simply for the sake of convenience, and although as explained the reverse might as well be true, it will be assumed that plates 12 are positive and disposed between layers 14 of positive active material (e. g. nickel hydroxide) and that the plates 13 are negative and the layers 15 are of negative material, e. g. finely divided iron. Each of the conducting plates, active material layers and asbestos paper separators is provided with a central aperture through which passes, in a manner presently to be explained, a central pole member 18, advantageously in the form of a vertical tube of suitable metal, e. g. iron, nickel, or preferably nickel-plated steel.

Referring now to Figs. 2 and 4, it will be seen that the plates 12 are of a generally square contour, somewhat smaller than the interior perimeter of the can and having their corner portions slightly further cut back, at 20, 20 so as to be sure to clear the connecting tabs of the negative plates as described hereinbelow. As originally cut or stamped, the central aperture in each of the positive plates 12 is slightly smaller than the outside diameter of the tube 18 along the region where the stack of plates is to be disposed; for example, where the post 18 has a diameter there of about 1.375 inches, the original diameter of the hole in the positive plates may be about 1.343 inches, i. e. a difference of approximately $\frac{1}{32}$ inch. The negative plates 13 (Fig. 5) have a central opening 21 somewhat larger than the central pole member (for instance, in the example noted above, about 1.531 inches in diameter, or about $\frac{5}{32}$ inch larger) and while being spaced, say, about $\frac{1}{8}$ inch from the inside walls of the can along the central portions of their side edges, as at 22, the negative plates 13 are originally made with the portions of their side edges immediately adjacent the corners, extending somewhat further than the inside cross-section of the can. Thus, for example, as cut or stamped out for a square can having an interior side of about 3⅜ inches, the outermost dimensions of the plates 13 as measured between each pair of opposed, parallel, corner-adjacent tabs 23, 23, would be about 3½ inches.

The asbestos paper separators 16 (Fig. 3) conveniently have a central aperture sufficient to clear the post 18 (for instance an aperture diameter of 1.468 inches in the example noted above), and their outer peripheries may be simple square, as shown, with a side approximately the same as, or perhaps slightly smaller than, the maximum transverse dimension of the positive plate 12.

As explained, and although other methods of applying the active material or of making up its layers may be used, a convenient practice is to apply on one side of each separator 16 a suitable layer of positive active material, and on the other side, a suitable layer of negative active material; it being understood that the composition of such layers may be as previously proposed for cells of this type and may be applied to the asbestos separators in a way heretofore known in the art. The coated separators and alternating positive and negative plates are then made up into a stack, with the alternating relationship previously described, e. g. as illustrated in Fig. 2. The stack is disposed between a pair of relatively heavy metal end plates or clamping members 24, 25, which have a square outer periphery somewhat smaller than the inside of the can 10, for example, of a size equivalent to the maximum outer dimension of the positive plates 12. The central hole of the end clamps 24, 25, may be such as to clear or just fit the hollow pole 18.

As disposed between the clamping plates, the pile of laminae is now subjected to heavy compression by suitable means, for example in a hydraulic or other press having structure for engaging the outside faces of the clamping plates in such a way as to leave the central openings and some surrounding surface portion clear. With the pile thus compressed, the central pole member 18 is then forced down into the long hollow or tube formed in the stack of plates. It will be noted that the central pole member has a reduced threaded portion 26 at its lower extremity, set back from the main cylindrical surface 27 of the member by a short conical taper 28. The tapered or chamfered portion 28 facilitates the forced entry of the pole member into and through the compressed pile, and it will now be appreciated that as the member is thus forced down, the inner circular edges of the positive plates 12 are engaged by the cylindrical surface 27 of the pole member and uniformly bent or deformed downwardly to a very appreciable extent, as shown at 30 in Figs. 2, 4 and 5. Thus in each of the plates 12, the tube 18 draws an eyelet, which throughout its circumference presses resiliently but very strongly and permanently against outer surface of the tube.

With this operation completed, a clamping nut 31 is screwed on the lower threaded portion 26 of the tube 18 and a similar clamping nut 32 is likewise screwed on a threaded portion 33 of the tube at the upper end of the stack of plates. The nuts 31 and 32 are then tightened toward each other, so as to maintain effectively and securely the desired compressed condition of the stack of plates, and so that the latter are now firmly mounted on the pole member 18. It will be seen that the plates 12, being of thin but considerably resilient metal, are thus firmly held in good electrical contact with the central pole member, by virtue of the continuous pressure exerted by their bent portions 30, deformed under constant stress by and about the periphery of the cylindrical wall 27.

Thus the central pole member serves not only to provide a mounting and clamping element for the stack of laminae, but also to secure efficient electrical connection to one set of the metal connecting electrodes therein, e. g. the positive plates. As shown in the drawings, such connection to the other, e. g. negative plates 13 is very advantageously made by the can 10 itself, in a generally similar manner. To that end, the assembly of the pole member and attached stack of cell elements is forcibly inserted into the open end of the can, whereby the projecting corner tabs 23 of the negative plates 13 are bent upwardly as at 35 into uniform and firm contact with the adjacent inner wall portions of the can, the contact being maintained with continuous and relatively great pressure, by virtue of the preferred resilient nature of the plates 13.

To guide the laminated unit upon its insertion into the can and to maintain proper spacing of the unit therein, insulating spacers 36 of hard rubber or the like are disposed about the stack. Although other shapes or forms may be used, each of the illustrated spacers advantageously comprises a vertically disposed strip portion 37 having a thickness equal to the distance between the outer extremities of the positive plates 12 (and the end clamps 24, 25) and the inner wall of the can when the assembly is placed in a central position in the latter. At its lower end, each spacer has an integral, conveniently semi-circular flange 38, designed to project beneath the underside of the lower clamp 25, and for better and more positive alignment of the assembly, each spacer may also have a projecting stud 39 which enters a cooperating hole or recess 40 in the adjacent vertical face of the lower clamp 25. Conveniently, four of these spacers 36 are employed, disposed respectively on the four sides of the stack of plates and held with the latter as the assembly is forced into the can. It will thus be seen that proper spacing of the assembly is secured, so as to afford uniform deformation of the negative plate tabs 23, and likewise so as to space the assembly properly from the bottom of the can. A further advantage of the spacing elements is that the can wall may then be economically made of relatively thin sheet metal, the side and end portions of the spacers serving to enhance the mechanical strength of the completed cell.

The central pole 18, being conveniently hollow, serves to promote the access and circulation of liquid electrolyte to the electrode stack, and to facilitate that function, the outer surface 27 of the tube 18 has a pair of opposed longitudinal grooves 42, extending between regions adjacent the clamping plates 24, 25. Direct access to the grooves is improved by suitable apertures in the tube wall, for example, as at 43, 43; further access being had through the open bottom end of the tube, which communicates freely with spaces 44, 44 (Fig. 5) along the sides of the stack.

The upper part of the tube 18, conveniently of somewhat reduced outside diameter so as to facilitate the assembly operations, is of such dimension as to extend above the top of the can 10, and conveniently terminates with a rather long exterior threaded portion 45. Intermediate the threaded portion 45 and the stack of plates, there may be further apertures in the tube wall as at 46, 47, for better circulation of electrolyte and for escape of gas.

To support the upper end of the member 18 and to enclose the top of the can 10, a sheet metal cover 50 is provided, having a peripheral flange 51 which may be welded or otherwise secured to the outer wall of the can as shown, the cover 50 having also a central circular opening surrounded by a similar flange 52. An insulating ring 53 having an inwardly projecting shoulder 54 and grooved at 55 (between the shoulder and its main body) to overlie the flange 52, is disposed on the upper side of the cover 50, as shown. A soft rubber packing ring is placed within the circular flange 52 and around the threaded portion 45 of the post 18, the diameter of the flange 52 being appropriately larger than the outside diameter of the post 18. The post is clamped through the assembly just described to the cover 50 by means of a lower nut 57, facing a hard rubber washer 58, and on the upper side, a clamping nut 60 spaced from the ring 53 by a suitable washer 61. It will now be seen that the parts are readily assembled by fitting the nut 57, washer 58 and soft rubber ring 56 in place about the threaded part of the post 18. Thereupon the cover 50 is seated in place, and the ring 53, washer 61 and nut 60 fitted on. Upon screwing down the nut 60, the parts are tightened together and the rubber ring 56 is effectively distorted into sealing engagement between the flange 52 and the post 18, firmly clamping the post 2, but insulating it from the cover 50. A further terminal nut 63 may also be provided, for securing an appropriate electrical connecter or lug between the nut 63 and nut 60.

The hollow post 18 may conveniently serve the further purpose of providing a filling opening for the cell, and in cooperation to that end, the upper interior of the post is suitably threaded to receive a filler cap 65 which may have the usual vent opening 66. It will be noted that the tubular form of the post 18 is also of advantage in other respects, for instance in that with a given cross section area of metal, the clamping nuts 31, 32 hold the pile over a much larger radius than if a solid pole were used.

Although single cells may be readily and economically manufactured, having a container of square (or rectangular) cross-section as shown in Figs. 3 to 5, further advantage and economy in the manufacture of multiple cell batteries, is afforded by the structure more fully shown in Fig. 1. As previously explained, a single container with a central partition 11 is utilized to embody two cells, and it will now be appreciated that by appropriately arranging the active material and the plates in the respective stacks of laminae (i. e., so that the can-connected plates 13 are of opposite polarity in the two cells), the container will constitute the negative pole of one cell and the positive of the other, whereby the two projecting terminals (generally designated 18 and 18a in Fig. 1) will constitute the positive and negative terminals of the two-cell battery, thus dispensing with two additional terminals and an inter-cell connector, ordinarily necessary in connecting a pair of cells.

It will now be appreciated that the described arrangement provides a remarkably efficient and yet extremely simplified and inexpensive cell construction. The hollow central post 18 serves a multiple purpose, viz. in constituting a common connector for all plates of one polarity, in providing a clamping element for the stack of plates, in serving to promote circulation and access of electrolyte, in providing a projecting terminal for the cell, and in constituting the filling means for adding electrolyte, water or other electrolyte material to the cell. At the same time, the can 10 serves as container and cell case, as connector for all plates of the opposite polarity and as means for external connection to the other pole of the cell. The arrangement of plates and parts is such that a completely positive and permanent contact is afforded between the several plates 12, 13 and the central pole and the can respectively; while the remaining organization of the cell cooperates directly to maintain the electrical and mechanical connections in the desired relations. Notably, moreover, the stack of plates, separators, and active material is maintained under the desired high compression by virtue of positive clamping action exerted through rugged metal clamping members, without the use of insulating washers, sleeves or clamps, so that there is no tendency to relaxation of the pressure by virtue of cold flow, deterioration or other distortion of insulating assemblies.

The whole cell constitutes a compact, mechanically strong and highly efficient unit, made with a remarkably small number of parts, which themselves are of extremely simple construction. As explained, the assembly operation consists merely in assembling the stack, compressing it, forcing in the central pole 18, clamping the latter to the stack, thereafter forcing the clamped stack and the spacers 35 into the can 10, and finally putting together the cover assembly, clamping it with the nut 60, and welding or otherwise fastening the flange 51 to the top of the can. As also explained, the multiple cell construction shown in Fig. 1 constitutes a further feature of distinct advantage in that separate terminals and a separate connector between the cells are entirely obviated, while at the same time both cells are made of exactly the same kind of parts and the method of assembly is exactly the same.

A somewhat modified form of construction is illustrated in Figs. 6 and 7. Here the central connecting tube extending through the stack of laminae is omitted, and instead, the laminated structure is clamped together by metal straps 101 (conveniently one of each side of the square assembly) which have flanges 102, 103 at their opposite ends, the flanges being swaged into appropriately tapered or sloping recesses 104 in the outer surfaces of the clamping plates 106, 107.

The can-connected metal plates, e. g. the negative plates 108, are generally of the same shape as the plates 13 of Figs. 2 and 3, except that a portion of each side of the plate 108 is cut back, as at 109, so as to permit passage of the clamping straps 101 without electrical contact. The positive plates, instead of connecting to a central post, have wide tab portions 111 at the center of each side, formed by spaced notches and with the outer edges of the tabs conveniently a little recessed from the corner portions of the plate. The asbestos paper separators 112 are shaped as shown in Fig. 7, with recessed portions 113 on each side, for passage of the straps 101. The upper clamping plate 106 has an upstanding tubular projection 118, which may be cast integral with the plate or suitably secured to it; it will be appreciated that the tubular projection 118 can be threaded at its upper part, for attachment to a cover 120 of the containing can 121 in the same fashion as the mounting of the pole 18 to the cover 50 of the structure in Figs. 1 to 5. Each of the positive and negative plates 110, 108, and the paper separators 112, has a central aperture, conveniently circular, and these apertures may be of the same dimension and equal to the internal diameter of the tubular portion 118, so that when the stack is assembled, a tubular opening extends vertically through it, to facilitate access and circulation of electrolyte.

The assembly of the cell of Figs. 6 and 7 is very simply effected by putting the stack of elements together, the separators being coated with active material as in the case of the cell of Figs. 1 and 2, and exerting clamping force against the outer plates 106, 107—conveniently centrally thereof. The clamping straps 107 are then forced respectively against the four sides of the assembly stack, preferably with some slight downward movement (the flanges 102, 103 being bent back to permit this operation if necessary). In this way, the side tabs 111 of the positive plates are brought into firm contact with and deformed by the straps 101, and while the latter are held under pressure against the sides of the stack, their flanges 102 and 103 are turned down against the clamping plates, and there swaged, spot-welded or otherwise secured into the recesses 104. The resulting assembly is a pile of positive and negative elements, maintained under the desired high pressure, and appropriately clamped by permanent, metallic clamping means which, in their clamped condition, provide firm and permanent electrical connection to the bent or deformed tabs 111 of the resilient positive plates 110.

This assembly is then inserted into the can 121, with the necessary force, just as the clamped assembly of Figs. 1 and 2 is inserted. As a result, the corner tabs 125 of the negative plates are bent into secure electrical contact, of a resilient nature, with the corner portions of the inner can walls, and the entire assembly is thus firmly seated in the can. If desired, a suitable spacing member 127 may be disposed in the bottom of the can to prevent contact between the lower ends of the straps 101 and the floor of the can. The final step is to apply the sealing and cover parts, which may be the same, and assembled in the same way, as described in connection with Figs. 1 and 2. The resulting structure partakes of simplicity, rigidity, ruggedness, and economy of parts, akin to the structure of Figs. 1 and 2, and provides a new and highly effective cell construction, wherein the desired pressure on the laminated electrical elements is permanently secured, without the use of insulating clamping members or the like. The structure of Figs. 6 and 7 may be readily embodied in twin cell units, in the same way as shown in Fig. 1 and with substantially the same advantages as are involved in the twin unit of the latter figure.

There are also some specific advantages of the embodiment of Figs. 6 and 7, over that of Fig. 2: for instance, the elimination of the clamping nuts saves their weight, and permits a shorter and more compact cell, which saves electrolyte and can metal and thereby further reduces the weight. The four tension members or straps 101 are less expensive to make than the long tubular pole 18 which would need considerable machine work and might be a more expensive raw material. Furthermore, this construction provides an unlimited supply of electrolyte to the entire inner edges of the active materials and the separators.

Although the cells may be made in a variety of configurations, as with rectangular or round plates, or relatively large plates having a plurality of central apertures, the described constructions are of particular advantage with reference to simplicity, ease of orientation in assembly, and adaptability of the finished unit to embodiment in a battery. It will be understood that the proportions and dimensions of various parts may vary as desired, specific measurements being given only as one example of what would now appear to yield satisfactory results for certain purposes. For instance, the can structures may be made of sheet steel, nickel plated, and having a wall thickness of about $\frac{1}{32}$ of an inch or perhaps somewhat less. The plates 12, 13, 109, 110, may be made of relatively stiff nickel sheet (or iron, steel, nickel-plated steel or other suitable metal) having a thickness of about 0.002 to 0.003 inch. The grooves 42 in the tubular pole of Fig. 2 may have a depth of about $\frac{1}{8}$ inch or so and the holes 43 a diameter of about $\frac{1}{16}$ inch. In general, the excess of metal to provide central eyelets in the positive sheets 12 of Fig. 2 and to provide the bent condition of the tabs 23, 111 and 125, may conveniently amount to about $\frac{1}{64}$ inch under the circumstances disclosed, e. g. the outside diameter of the pole 18 exceeds the inside diameter of the holes in the plates 12 by approximately $\frac{1}{32}$ inch.

It will be appreciated that considerable exaggeration of the thickness of the elements of the compressed pile is embodied in the showings of all the drawings, particularly with respect to the layers of positive and negative active material. It will further be understood that the nature and thickness of these materials, and the nature and thickness of the separators 16, 112, may vary as desired, and likewise the composition of various other parts, such as the can and clamping members—which may be of compatible conductive material, e. g. iron, steel, nickel, or nickel-plated steel, having the necessary mechanical characteristics. All these and other electrical or chemical features may embody any desired one of a considerable variety of forms and compositions, reference being made, for example, to the above-mentioned Edison patents describing suitable characteristics of these elements. The same is true with respect to the actual amount of pressure to be maintained in the stack of electrical parts of the cell, suitable examples of such pressures being described, for instance, in the cited patents—e. g., an initial pressure of about 13,000 pounds per square inch, before the clamping, and a working pressure of about 8,000 lbs. per square inch.

Bearing in mind that a maximum of pressure is desirable for minimum electrical resistance in the contact between the metal plates (12, 13, etc.) and the active material layers, and yet too great a pressure may reduce the desired porosity of the fibrous separators, it will now be seen that the construction of the present invention, wherein the permanent pressure may be readily predetermined during the assembly operation, permits exact attainment of a desirable compromise in the amount of pressure to be applied and maintained throughout the life of the cell. A further particular advantage of the types of construction shown is that, if there is some minute resilience in the various metallic clamping members and straps, there will be sufficient yield to take up the very slight expansion of the positive active material which sometimes occurs on charge of the cell, and the corresponding contraction on discharge, without permitting so great a pressure change in the operating cycle as to effect either too much compression of the porous separators or too great a voltage drop in the electrical circuit.

As explained hereinabove, the invention entirely avoids the need for washers, clamps or other elements of hard rubber or like plastic insulating material in the compressed pile, and thus there are avoided all the conditions of non-uniformity, uncertainty and shortness of life involved in the use of such elements. As a result the invention makes it practical to build cells in large quantities with long life and uniformly high efficiency in performance, an important feature to that end being the arrangement whereby the clamping members act as bus or connector for only the elements of one polarity, so that there need be no insulators under compression.

It may be noted that a particular advantage of the structures herein illustrated is that the disposition of the deformed tabs 23, 125 adjacent the corners of the can affords a maximum of strength and an assured permanence of electrical contact; it should be apparent that any casual or accidental bending or other deformation of the can walls will necessarily be opposed by at least a considerable portion of the deformed tabs at the corners, or will necessarily result in a balancing deformation of some other part of the can, which would in turn be so opposed at one or more corners, and the effect of such opposition would be to increase rather than impair the firmness of electrical contact.

It will be understood that where a battery is to be made requiring series connection of a plurality of twin cells of the type shown in Fig. 1, the several twin units should be insulated from each other, as by appropriate insulating walls of hard rubber or the like; the same being true with respect to single cell units wherever the can of one cell is to be disposed in proximity to another cell can having a different potential in the complete circuit. Where single cells are separately connected, or in other cases where connection must be made to a cell can, as for at least one cell in a battery having an odd number of cells, a suitable lug or other connecting device (not shown) may be welded to the can or the metal cell cover.

The insulating spacers 36 (Fig. 2) promote the mechanical rigidity and strength of the can and of the complete cell. The side strips 37 of these spacers prevent misalignment, impairment of the edge contacts, or other derangement of the laminae in the compressed stack, as might otherwise be occasioned by side thrust or strain due to the inertia of the stack, under conditions of rough handling, heavy vibration, severe road shocks and the like. A similar purpose is served by the underlying flange 38, especially to relieve the can cover 50 of excessive strains due to the weight of the stack, as under the stated conditions. In Fig. 6, the supporting insulator 127 serves a similar purpose to that of flange 58, and although omitted from this view for the sake of clarity, insulating side strips similar to the strips 37 would preferably be disposed between the members 101 and the can walls (or the complete members 36 might be used, omitting member 127) for the purposes stated.

It is to be understood that the invention is not limited to the specific embodiments herein shown and described by way of example, but may be carried out in other forms and with the use of equivalents, without departure from its spirit.

I claim:

1. Electrical storage cell structure comprising a conductive container, a laminated assembly of active elements disposed therein, metallic clamping means directly engaging opposite ends of said laminated assembly for maintaining the same under predetermined desired pressure, said assembly including alternating, spaced conducting members providing plates of respectively opposite polarity for the cell, the plates of one polarity being appreciably larger than the cross-section of the container and having the edges of said plates bent into compressive contact with the wall of said container, and the other set of said plates of the opposite polarity, having projecting portions bent into compressive contact with said clamping means, whereby said clamping means and container serve jointly to support the laminated elements in the desired compressed relation, and respectively to provide electrical terminals for the cell.

2. Electrical storage cell structure comprising a laminated assembly of metallic plates of alternating polarities and separating means intermediate the plates, and metallic clamping means directly engaging opposite ends of said assembly for holding the latter in compressed relation, the plates of one polarity having aligned edge portions extending transversely beyond adjacent edge portions of the other plates in the assembly, and the clamping means including a metallic member extending between the ends of the assembly and forcibly abutting said extending edge portions with the latter flexed from their natural planes and thereby maintained in deformed engagement with said member.

3. Electrical storage cell structure comprising a compressed, laminated electrode assembly including spaced resilient metallic plates, a container for the assembly, having conductive interior surface portions, and means for clamping the assembly in compressed condition, including connecting means extending between the ends of the assembly and having conductive surface portions, some of said plates having projecting edge portions deformed into compressive contact with the conductive surface portions of the container, and other of said plates having projecting edge portions deformed into compressive contact with the conductive surface portions of the connecting means.

4. The structure of claim 3, wherein the assembly has a passage longitudinally thereof, provided by aligned apertures in all of said plates, and wherein the clamping means includes metallic members directly engaging the ends of the assembly, and the connecting means comprises a metallic clamping element extending through the passage and directly fasten to the said metallic members, the second-mentioned of said plates having apertures smaller than the cross-section of the clamping element, thereby providing projecting edge portions deformed into compressive electrical contact with the clamping element.

5. The structure of claim 3 which includes a second electrode assembly and associated clamping and connecting means, all of the character described in claim 3, and wherein the container comprises a metallic can partitioned to form a plurality of compartments, said electrode assemblies and associated means being respectively disposed in said compartments with projecting edge portions of some of the plates of each assembly deformed into compressive contact with the interior surface of the respective compartment, thereby providing a series combination of cells for which terminal connections need extend only to the respective aforesaid connecting means.

6. Electrical storage cell structure comprising a laminated electrode assembly of active members including a plurality of plates having edge portions projecting exteriorly of the assembly, and a metallic clamping structure engaging the ends of the assembly and exerting end pressure on the assembly to hold the plates in compacted condition, said clamping structure including connecting means extending along the assembly in compressive engagement with said edge portions, said edge portions being deformed against said connecting means, and said connecting means being subjected to tension due to the reaction of the assembly to the pressure exerted by the clamping means upon the ends of the assembly.

7. Electrical storage cell structure comprising a compressed laminated assembly of resilient metallic plates of alternating polarity faced with active material, said assembly including electrolyte-traversable separators intermediate the plates, and the plates of one polarity having edge portions projecting exteriorly of the assembly, and connecting means exerting axial compression on the ends of said assembly and having a conductive surface compressively engaging said projecting edge portions, said edge portions being deformed against said connecting means.

8. Electrical storage cell structure comprising a laminated electrode assembly including a plurality of resilient conductive plates each having an aperture therein and said plates being stacked with their said apertures in alignment, and a metallic clamping element having a conductive surface disposed through the aligned apertures and having metallic means directly engaging said element and the opposite ends of said assembly for compressively clamping the latter together and to said clamping element, said apertures being smaller than the cross-section of said element and edge portions of the plates at said apertures being flexed into forcible contact with the conductive surface of the clamping member.

9. Electrical storage cell structure comprising a laminated electrode assembly having an opening longitudinally thereof and including a plurality of parallel, conductive plates, and a metallic tubular member traversing said opening and carrying means clamping said assembly together and upon said member, each of said plates having an edge portion projecting into said aperture and said edge portions being flexed into compressive contact with said tubular member, and said tubular member being apertured for passage of electrolyte between the center thereof and said assembly.

10. Electrical storage cell structure comprising a laminated electrode assembly having a centrally disposed longitudinal opening and including rigid metallic end plates, and intermediate said end plates, a plurality of parallel, conductive electrode plates, a metallic member traversing said opening and having metallic means rigidly and directly securing said member to said end plates for clamping the stack together, alternate ones of said electrode plates having an edge portion projecting into said aperture and said edge portions being flexed into compressive contact with said member.

11. Electrical storage cell structure comprising a clamped assembly of active elements including a plurality of parallel plates of common polarity having integral projecting portions, means clamping said active elements in clamped assembly, and a conductive container holding said assembly and said clamping means and confining a body of electrolyte about the same, said projecting portions being adapted to extend beyond the interior cross-section of the container and said assembly being forcibly fitted in the container with said projecting portions deformed into compressive electrical contact with the interior of the container and thereby cooperating to support the assembly therein.

12. Electrical storage cell structure comprising a can, a clamped, laminated electrode assembly including plates of alternating polarity, and connecting means compressively engaging and deforming edge portions of the plates of one polarity, the plates of opposite polarity having edge portions projecting exteriorly of the assembly, and the assembly being disposed in the can with said exteriorly projecting edge portions deformed in compressive engagement with the can interior.

13. Electrical storage cell structure comprising a clamped assembly of plates of alternating polarity, porous insulating separators between plates of opposite polarity, means clamping said plates and separators in contacting relationship, a container having conductive interior surface portions, the plates of one polarity having resilient edge portions projecting transversely beyond the adjacent edges of plates of other polarity, and said assembly being mounted in said container with said projecting edge portions forcibly deformed against said conductive surface portions.

14. Electrical storage cell structure comprising a compressed electrode assembly including substantially superposed thin and resilient plates of alternating polarity, the plates of one polarity having projecting edge portions aligned along a predetermined side portion of the assembly, and the plates of another polarity having projecting edge portions aligned along another predetermined side portion of the assembly, porous insulating material between plates of opposite polarity, and supporting and electrical connecting means for said assembly, including conductive means engaging the projecting edge portions of the plates of first-mentioned polarity and conductive means engaging the projecting edge portions of the plates of second-mentioned polarity, the said projecting edge portions of the plates being respectively flexed into forcible contact with the respective conductive means engaging the same.

15. Electrical storage cell structure of the alkaline electrolyte type, comprising a can, a compressed laminated electrode assembly disposed in said can and including thin, resilient metallic plates of alternating polarity faced with finely divided active electrode material, said assembly including electrolyte-traversable separators intermediate the plates, and the plates having projecting edge portions disposed and aligned to provide separate aligned sets of said projecting portions respectively corresponding to the respective polarities of the plates, and one set of said projecting portions being adapted to extend beyond the interior cross-section of the can, metallic clamping members respectively abutting the ends of the assembly and metallic connecting means directly fastened to said members for clamping the same and the assembly together, said connecting means being disposed along the other set of projecting edge portions, and said sets of projecting portions being deformed into compressive contact respectively with the interior of the can and with said connecting means.

16. The structure of claim 15 wherein the plates and separators having apertures to provide a passage through the assembly and wherein the connecting means comprises a tubular member traversing said passage, said member being apertured and being shaped relative to the apertures to provide a region of space between it and the passage, for circulation of electrolyte through the member and to the plates and separators, and the apertures of the plates of opposite polarity to those connected to the can, being smaller than the cross-section of said tubular member, and thereby providing the set of projecting edge portions deformed into compressive contact with the connecting means constituted by the tubular member.

17. The structure of the claim 15 wherein the can is of rectangular cross-section in the planes of the plates and wherein the plates connected to the can include a plurality of sets of aligned projecting edge portions respectively disposed adjacent the corners of the can and there compressively deformed into forcible contact with the can interior, thereby both securing the assembly in the can and reinforcing the corners of the latter.

18. In a method of manufacturing an electrical storage cell, the procedure of clamping together a laminated assembly of electrode elements including a plurality of parallel resilient metallic plates having exteriorly projecting edge portions and forcing said clamped assembly into an interiorly conductive container having an inside cross-section smaller than that of said plates, thereby forcibly bending the projecting portions against the interior of the container, to secure the assembly therein and to provide electrical connection to the plates.

PAUL D. PAYNE.